US008495564B2

(12) United States Patent
Martineau

(10) Patent No.: US 8,495,564 B2
(45) Date of Patent: Jul. 23, 2013

(54) AUTOMATED MERGING IN A SOFTWARE DEVELOPMENT ENVIRONMENT

(75) Inventor: David John Martineau, Stouffville (CA)

(73) Assignee: International Business Machines Corporation, Armonk, NY (US)

( * ) Notice: Subject to any disclaimer, the term of this patent is extended or adjusted under 35 U.S.C. 154(b) by 1060 days.

(21) Appl. No.: 12/033,651

(22) Filed: Feb. 19, 2008

(65) Prior Publication Data

US 2009/0210857 A1 Aug. 20, 2009

(51) Int. Cl.
*G06F 9/44* (2006.01)

(52) U.S. Cl.
USPC ............................ 717/106; 717/120; 717/113

(58) Field of Classification Search
USPC .................................................. 717/101, 120
See application file for complete search history.

(56) References Cited

U.S. PATENT DOCUMENTS

| | | | | |
|---|---|---|---|---|
| 6,560,721 | B1 | 5/2003 | Boardmann et al. | |
| 6,766,334 | B1 | 7/2004 | Kaler et al. | |
| 7,152,224 | B1 * | 12/2006 | Kaler et al. | 717/121 |
| 7,251,669 | B1 | 7/2007 | Arora | |
| 7,266,805 | B2 | 9/2007 | Weidman et al. | |
| 7,603,393 | B1 * | 10/2009 | Cote et al. | 1/1 |
| 2004/0205727 | A1 * | 10/2004 | Sit et al. | 717/125 |
| 2006/0136510 | A1 | 6/2006 | Voronov et al. | |
| 2009/0210852 | A1 | 8/2009 | Martineau | |

OTHER PUBLICATIONS

Eric Sinc, "Business Software: Source control how to [on line]", Source Gear, Chapter 3 (5 pages), Aug. 26, 2004, (retreived from [http://www.ericsink.com/scm/source_control.html] on Jul. 2, 2011).*

Eric Sinc, "Business Software: Source control how to [on line]", Source Gear, Chapter 3 (3 pages), Aug. 26, 2004, (retreived from [http://www.ericsink.com/scm/source_control.html] on Jul. 2, 2011).*

IBM Rational Clear Case and Clear Case LT, Version 7.0.0, Introduction, 7$^{th}$ Edition, May 2006, 64 pages.

* cited by examiner

*Primary Examiner* — Wei Zhen
*Assistant Examiner* — Brahim Bourzik
(74) *Attorney, Agent, or Firm* — Sughrue Mion, PLLC

(57) ABSTRACT

A system and method for merging changed elements in a software development environment is provided, in which the software development environment is provided with a set of at least one defect, comprising at least one changed element, associated with a software project that comprises a plurality of elements, the software project comprising a plurality of elements. The environment first obtains a list of changed elements in a defect record, for example from a defect database, and for each changed element in the list, attempts an automated merge of the changed element with a corresponding target. If any attempt fails, the environment may re-attempt the merge for any failed attempt, and may invoke a user interface for resolving the merge manually.

17 Claims, 3 Drawing Sheets defect 578 foo.c@@/main/my_proj/2 [comments]
…
…
…
410 defect 099

…
foo.c@@/main/my_proj/2 [comments]
…
…
420 defect 354

Figures 4, 5:
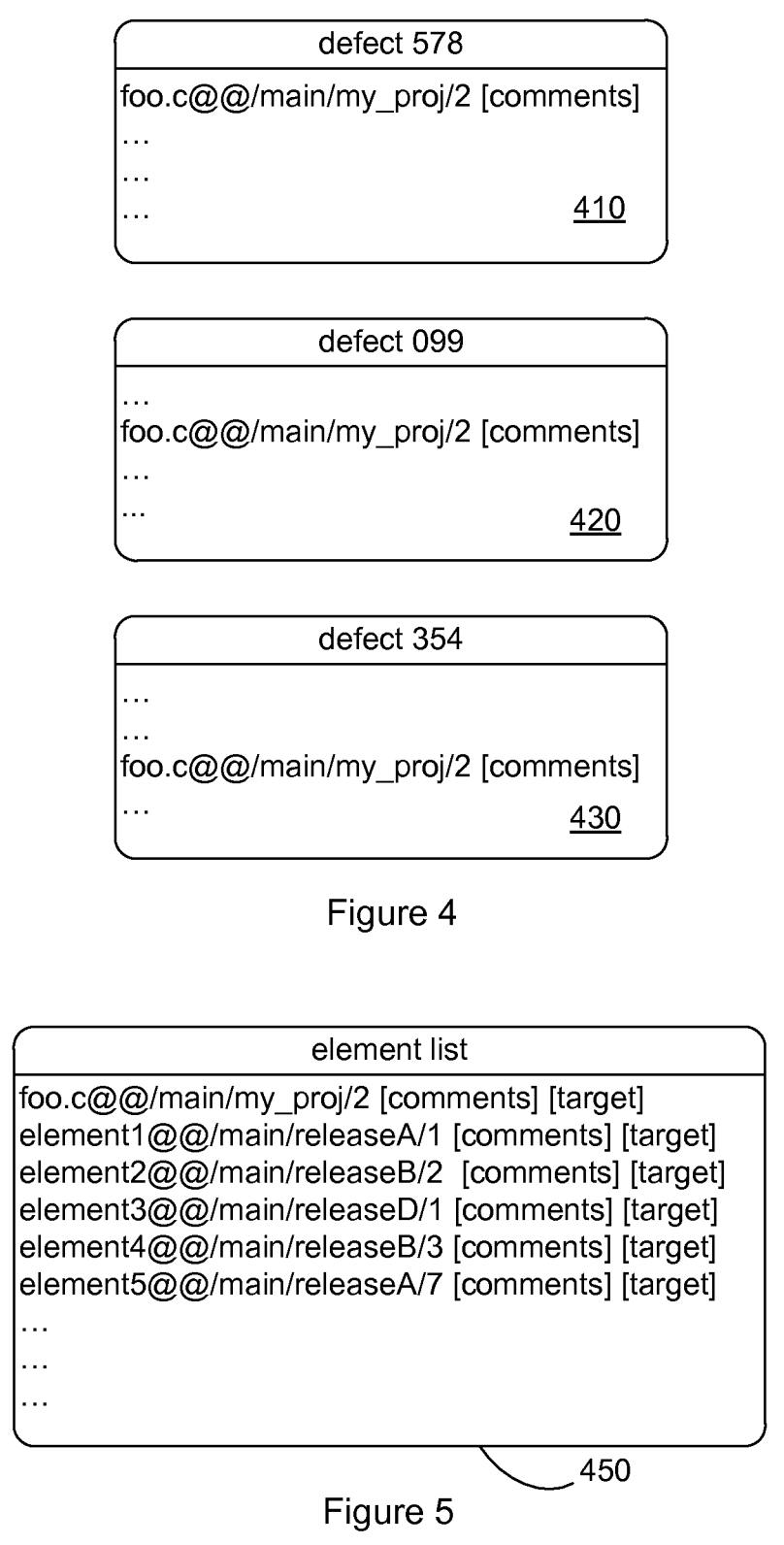

…
…
foo.c@@/main/my_proj/2 [comments]
…
430

Figure 4 element list foo.c@@/main/my_proj/2 [comments] [target]
element1@@/main/releaseA/1 [comments] [target]
element2@@/main/releaseB/2 [comments] [target]
element3@@/main/releaseD/1 [comments] [target]
element4@@/main/releaseB/3 [comments] [target]
element5@@/main/releaseA/7 [comments] [target]
…
…
…

AUTOMATED MERGING IN A SOFTWARE DEVELOPMENT ENVIRONMENT

TECHNICAL FIELD

This invention relates generally to managing changed elements in a software development environment, and in particular to automated systems for merging multiple changed elements in projects within a software development environment.

DESCRIPTION OF THE RELATED ART

Software configuration management (SCM) systems allow users to manage multiple variants of the various objects or elements of software projects, and in particular may be configured to allow development teams to work in parallel in writing, modifying, porting, and upgrading software system elements while providing management or auditing tools for monitoring the changes made to the elements, and building software products from a plurality of elements. For example, the SCM may provide a check-out-edit-check-in model, in which an individual programmer may "check out" an element from a data repository, creating a local editable copy of the element, edit the element, then "check in" the element again in order to integrate the changes made with the data repository. The newly-changed element is stored as a new version of the element, and auditing features of the SCM may record information regarding the changes made. The SCM system may provide for the merging of a changed software element with other versions of the same base element to produce a new version of the element, sometimes referred to as "forward fitting", as well as means to record information about the merge for future reference. The foregoing features may be provided in a single SCM product, or alternatively may be provided by software products that separately provide for configuration management and tracking defects and changes made to the elements stored in the data repository.

Changes may be made in response to a feature request or a bug report, or may result from the addition of new functionality to the software project. In a single release of a software product, the number of feature requests, fixes, or additions may number in the hundreds or thousands, and the number of elements changed in response to each of these requests, fixes, and additions may number in the hundreds or thousands as well. In addition, elements may be shared between software projects, and therefore changes to elements made in the context of a first software project need to be merged not only into a first software project, but also into a further software project. The programmer can address this need after changes to an element in a first software project have been checked in by checking in a corresponding element for the further software project, adding the changed element to the further software project, and merging the changed element with the further software project; however, given a large volume of changes that may be made in even a single software project, this manual solution is onerous.

It is therefore desirable to provide a system and method in which changes to an element may be merged into multiple software projects on an automated or semi-automated basis, thereby minimizing user intervention. It is also desirable to provide this feature in a SCM system or other software development environment for managing multiple software projects sharing elements.

SUMMARY OF THE INVENTION

In accordance with a first embodiment, the invention provides a method for merging changed elements in a software development environment, the software development environment comprising a set of at least one defect associated with a software project, the software project comprising a plurality of elements, each defect being associated with at least one changed element comprising a modified version of an element, the method comprising obtaining a first list of changed elements in a defect record, the list comprising at least one changed element identifier and a corresponding target, the defect record comprising a list of changed elements associated with a defect; and for each changed element thus listed, attempting a first automated merge of said changed element with its corresponding target.

In accordance with a further aspect, a computer program product is provided, comprising a computer usable medium embodying a computer readable program, wherein the computer readable program when executed on a computer providing a software development environment comprising a set of at least one defect associated with a software project wherein the software project comprises a plurality of version-controlled software development objects, each defect being associated with at least one changed element, and each changed element comprising a modified version-controlled software development object, causes the computer to obtain a first list of changed elements in a defect record, the list comprising at least one changed element identifier and a corresponding target, the defect record comprising a list of changed elements associated with a defect; and for each changed element thus listed, attempt a first automated merge of said changed element with its corresponding target.

In accordance with still a further aspect, a system is provided for merging changed elements in a software development environment, the software development environment comprising a set of at least one defect associated with a software project, the software project comprising a plurality of elements, each defect being associated with at least one changed element comprising a modified version of an element, the system comprising a data repository for storing at least one element associated with a software project, and for storing at least one changed element comprising a modified element; a data repository for storing at least one defect record, the defect record comprising a list of changed elements associated with a defect; and a software development environment interoperable with the data repository for storing at least one defect associated with a software project and for merging changed elements with a corresponding target, wherein the software development environment is configured to obtain a first list of changed elements in a defect record, the list comprising at least one changed element identifier and a corresponding target; and for each changed element thus listed, attempt a first automated merge of said changed element with its corresponding target.

BRIEF DESCRIPTION OF THE DRAWINGS

In drawings which illustrate by way of example only a preferred embodiment of the invention.

FIG. 4 is a set of schematic representations of defect records in the software development environment;

FIG. 5 is a schematic representation of an element list in the software development environment.

DETAILED DESCRIPTION

The following embodiments are described in the context of a software development environment (SDE), which may be provided in, or as part of, a software configuration management system (SCM), or in conjunction with other software management tools for tracking, managing, or auditing projects created and edited in the SDE. In a first embodiment, a data repository is provided. The data repository may be secure or permanent, and may by globally accessed at a central repository. The data repository may alternatively be provided in a distributed environment. The implementation of such a data repository will be understood by those skilled in the art.

The SDE may operate as a configuration management product, providing for version control of various files and projects stored in the data repository. A single software project may comprise a plurality of software development objects of different types, such as text files, graphics, directories, hyperlinks, and the like. These objects, hereinafter referred to as elements, are stored in the data repository. Changes to the elements may be stored as separate files (i.e., complete copies of the changed elements), or as deltas or weaves, which in a single stored instance of the element records the differences or changes for each version of the element, and the SDE may track changes made to various versions of a given element; thus, the data repository may store a plurality of version-controlled software development objects or elements. Elements may also be stored in compressed file formats. Techniques for the recording of element changes and file compression will be known to those of ordinary skill in the art. The project may further comprise derived objects, such as executable program files compiled from source code material. These derived objects in turn may also be versioned, for example generated for each corresponding version of the element from which the derived object was generated.

Figure 1:
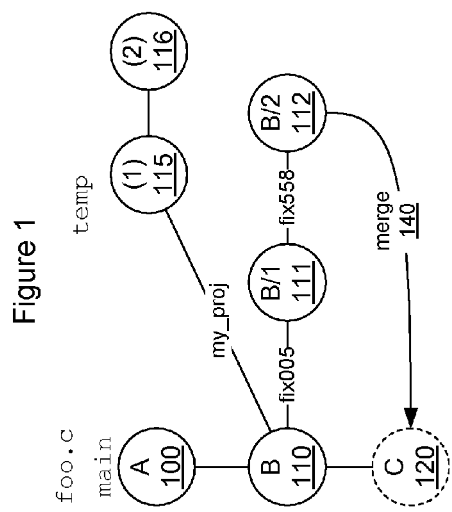
FIG. 1 is a schematic representation of an element version history in a first project for an element in a software development environment.

Referring to FIG. 1, a schematic representation of an exemplary embodiment of a version-controlled element foo.c in the SDE is shown, with a main branch (comprising elements corresponding to releases A 100 and B 110) and two subbranches. A first subbranch comprises elements B/1 111 and B/2 112, and may denote the revision history of the element in release B of the software project. As can be seen in FIG. 1, the first change to version B of foo.c, version B/1 111, was made in response to an identified defect labelled "fix005" while the second change was made to version B/1 111 in response to another identified defect labelled "fix558". A merge arrow 140 is drawn between version B/2 112 and C 120, indicating that the changes to the element foo.c made in B/2 112 have been merged with the main branch of the version history at a target, C 120. C 120 may represent the version of element foo.c that was included in release C of the software project. Modifications of the element foo.c may be made for a number of reasons; for example, modifications may be created to address a need to fix a reported bug in the software, or to port a project to a different platform, or to create a customized version of the software for a customer.

A second subbranch labelled "temp" is shown comprising two element versions (1) 115 and (2) 116, which may represent further revisions made to the element version B 110, but not yet integrated with the main branch of the version history. If it is determined that the changes to the element foo.c made in version (2) 116 should be merged with the released version of the element, then element version 2 (116) may be merged with the most recent released version of foo.c (here, C 120) at a target element destination D 130. The merge function, which incorporates the changes made to the changed element into a previous version of the same element for recording as a new, target element in the element's version history, may be invoked by a command line interface, through a graphical user interface, or other means, and may also be accomplished manually by the user, if desired. If the SDE provides a graphical user interface to illustrate the relationship among the changes to the elements, such as the graphical representation of FIG. 1*a*, then the SDE may also be configured to allow the user to insert merge arrows such as merge arrow 150, or to otherwise create or insert annotations in the SDE regarding the changed elements and the target elements at which they were merged. These annotations are useful when the SDE also performs an auditing function or management function that requires tracking of the merge history of each and every changed element. The annotations may be provided in the form of comment text or metadata stored in association with the changed element data, for example in the data repository.

Figure 2:
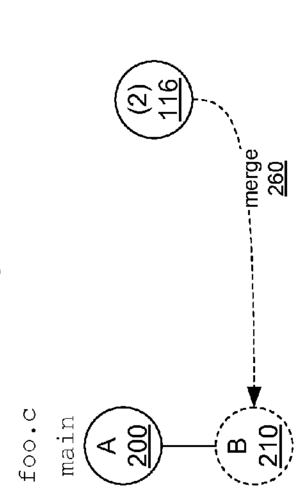
FIG. 2 is a schematic representation of an element version history in a second project for the element of FIG. 1.

The schematic representation of FIG. 1 may represent a view of the element in a first software project in a graphical user interface (GUI) of the SDE. The element foo.c may also be used in a different software project, with either the same or different revision history. FIG. 2 illustrates a further representation of the element foo.c as it may be viewed in the context of a second software project, with a main branch comprising release version A 200. If it is determined that changes made to the element foo.c in the first software project, resulting in the revision (2) 116 should be merged with the instance of the element in the second software project, then element revision (2) 116 may be merged with version A 200 at a target element destination, here labelled as B 210. This merging action is shown in phantom with merge arrow 260.

The examples of FIGS. 1 and 2 illustrate a simple example of the evolution of a single element foo.c, and its use in different software projects within the SDE. The development effort in creating and updating a software product may of course incorporate hundreds or thousands of changes to various elements of the product, by a large number of developers; moreover, for a given software product, a project may comprise a large number of elements, and a large number of change requests or fixes to be incorporated into the project, each affecting multiple elements. Further, when a single element is used in multiple projects that are managed using the SDE, it is possible that changes to that element in response to a change request or fix may need to be merged, not only with the project in which the modifications to the element were made, but with other software projects using that element. If the SDE is provided with functionality for automatically merging changed elements on an element-by-element basis within a given software project, for example by means of a script or other function built into the SDE, the programmer or team responsible for the changed elements would still be required to manually identify each changed element and the corresponding software projects in which the changed element is to be merged.

Accordingly, in the preferred embodiment, a system and method are provided to allow for the automated merging of changed elements in one or more software projects on a defect-by-defect basis. A defect may comprise a fault or unexpected behaviour identified in a software product, and may also refer to a change request or other issue, where it is desirable to make a change to a release of the software product to accommodate a specific requirement. Records of defects may be stored within the SDE or in a data repository to which the SDE has access; these records may also contain information associating the defect with at least one changed element. A single defect or change request may involve changes to multiple elements in a single software project. When a defect (or change request) is entered in the SDE, a record for that defect is created. The records relating to defects may be stored in a database or other suitable record-keeping format, although a relational database format may be preferred. The SDE may provide functionality for the management of defects, including assigning a defect to a programmer or team of programmers, modification of the defect report, and tracking work done to address the identified defect.

Examples of defect records are shown in FIG. 4. Defect record 410, for example, may be a defect record associated with a first software project, such as the software project in which the modifications (1) 115 and (2) 116 were made to the element foo.c, as described above with reference to FIG. 1. The defect record 410 may list a number of changed elements associated with the particular defect (numbered 578) represented in that record 410; here, the first changed element listed is the change to foo.c that is indicated in FIGS. 1 and 2 as (2) 116. The precise annotation used as an identifier of the changed element may be varied; here, for example, the identifier of the element foo.c is in the format foo.c@@/main/my_proj/2, indicating that the version of foo.c referenced is the second modification in the subbranch labelled "my_prog", which is split from the main branch "main". The identifier of the changed element identifies, within the SDE, the individual version of the element in its element history among all elements and versions thereof stored in the data repository. The identifier may take another format, provided the element can be located in the data repository. The defect record 410 may also list other changed elements that are associated with the same defect, not shown. The defect record 410 may also include comments that describe the nature of the change, or other information that is useful for documenting the modifications made to the element. Other defects may be recorded in records 420 and 430, which are associated with different software projects; in these examples, the same element version of foo.c is listed in the defect records, thus indicating that this changed element is associated with each of these other defects, even though these other defects may be associated with different software projects.

Figure 3:
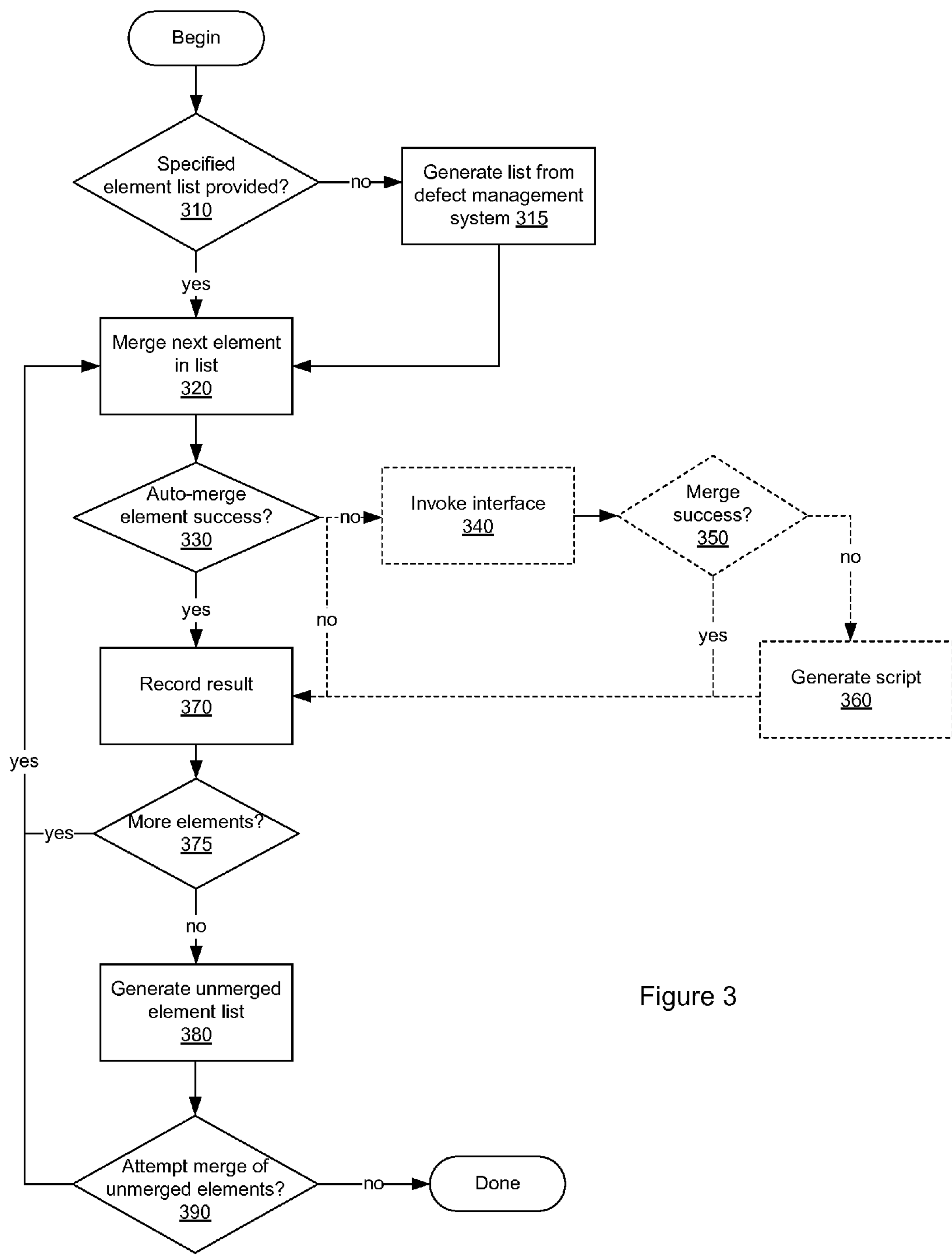
FIG. 3 is a flowchart of a method for automated merging of changed elements in the software development environment.

A method for automated merging of changed elements by the SDE is illustrated in the flowchart of FIG. 3. The process begins at block 310, where a list of changed elements to be merged is required. This list of changed elements may be provided by the user, for example if a programmer has prepared a specific list of changed elements to be merged; if this element list is provided, the process moves to block 320. If the element list is not provided, then the SDE may obtain or generate its own element list at block 315 by querying the defect database or other repository using a changed element or element identifier. If the identifier of the first changed element is provided (for example foo.c), the defect database may be queried for the defect record or records containing that changed element (for example, the defect records 410, 420, 430. The SDE may be configured to handle a single defect associated with the changed element (the defect identifier may be provided by the user to the SDE) or multiple defects. For a single defect record, an element list may be built, comprising the changed elements identified in the defect record, as well as other pertinent information that may be used by the SDE to complete a merge operation. For multiple defects, a separate element list may be built for each identified defect listing the changed elements identified in each defect record, or alternatively a single element list may be built listing all changed elements associated with all identified defects. The element list or lists may also include any programmer-entered comments stored in association with the changed element, as well as a target for the merge operation, which may comprise the target destination for the merged element, or the previous version of the element with which the changed element is to be merged. This information may be retrieved from the data repository storing the changed element data itself, or it may be stored in the defect database as part of the defect record. An example of an element list 450 is shown in FIG. 5.

Returning to FIG. 3, at block 320 the next changed element in the element list is located in the data repository, and the SDE executes its own functions or scripts for merging the changed element at the specified target. If the merge operation is determined to have been a success at block 330, then the process moves to block 370, where the SDE records the successful merge result. In a further embodiment, this recordal may comprise a revision of metadata associated with the changed element to reflect a successful merge, or a flag or indicator marked in the element list 450 indicating that the changed element merge was completed.

If the attempt at merging the changed element is determined at block 330 to have been unsuccessful, for example as a result of a conflict between versions of the element being merged, then an optional branch in the process of FIG. 3 may be followed to provide an opportunity for user intervention to resolve the merge. At block 340, the SDE invokes a graphical, text, or other user interface to alert the user to the failed merging attempt, and to provide the user with an opportunity to manually complete the merging. If this manual merge is determined to be a success at block 350, then the result is recorded at block 370. If the manual merge does not succeed, or if the user elects not to complete a manual merge, then the SDE may invoke a further routine at block 360 to generate a script that a user may use to invoke the merge function at a later date, or to invoke other tooling or functionality in the SDE to allow the user to make a decision regarding the merge. The attempt to merge is recorded at block 370, for example by revising the metadata associated with the changed element to reflect that an attempt at merging was made, or to add a flag or indicator to the element list 450 indicating that the merge was attempted (but not completed). Alternatively, in place of the branch 340-350-360, when the merge is determined to have failed at block 330, the SDE may simply record the outcome of the merge operation at block 370, as described above.

The SDE then determines at block 375 whether there are further changed elements in the element list 450 for merging; if there are, the process returns to block 320 and proceeds as described above. If there are no further elements to be merged, then the SDE may create a report, which may include a list of merged elements, a list of unmerged elements, or both; a list comprise the element list 450, with the addition of flags or indicators reflecting whether the merge of each listed element was successful or attempted.

The SDE may be configured to re-attempt the merge of the listed elements that were not successful in a previous pass at block 390, in which case the process resumes at block 320 with a revised element list. The revised element list may be an extract of the original element list 450, listing only those elements that were not successfully merged. Thus, for example, the user may configure the SDE to attempt automatic merging only without user intervention, avoiding the branch 340-350-360 for a first pass, and to re-attempt the merge for all elements in the element list 450 that were not merged successfully in a second pass in which the requests for manual intervention are invoked. It will be appreciated that this configuration saves user time, if it is determined after the first pass that the unmerged changed elements do not need to be merged at that time. It will further be appreciated that by executing the above-described method, the merging of numerous defects and changed elements across software projects may be delegated to another party, and need not be completed by the programmer or author who created the changed element or modified the defect record. If the delegate cannot make a determination regarding a merge operation at block 350 of the process, then the script generated at block 360 may be provided to an author of the changed element or original element for later consideration. The script may be forwarded automatically to the author by the SDE, if information regarding the author is also recorded in the changed element metadata or in the defect record.

Figure 6:
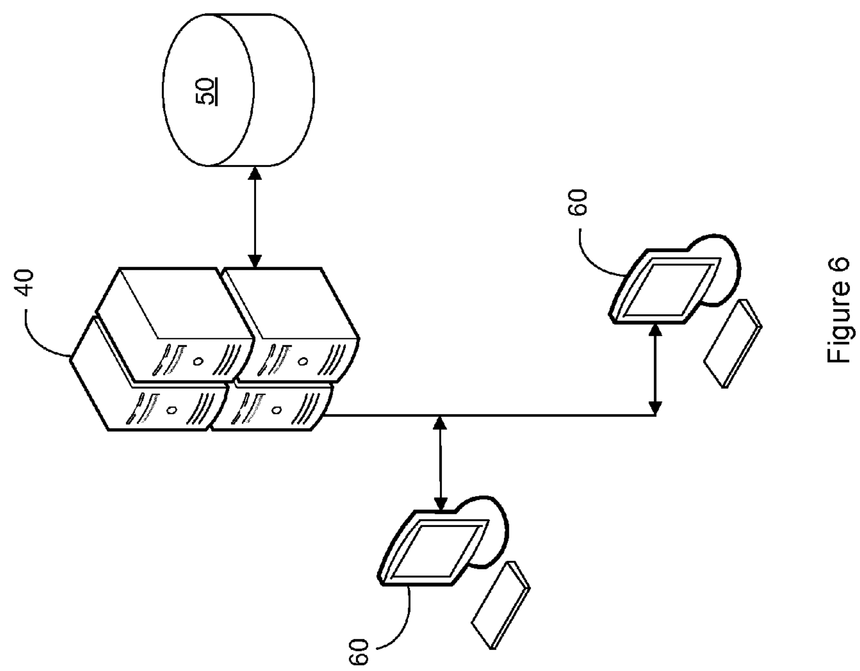
FIG. 6 is a schematic representation of a data processing system for implementing the method of FIG. 3.

The data stored in association with the various changed elements—the merge data or other documentation, comments, identity of the programmer or team responsible for the changed element or defect, and so forth—may be stored as metadata associated with the changed element or defect. The SDE may comprise elements to provide all functionality described above in a single, integrated product, or alternatively aspects of the SDE described above may be provided in a plurality of software development, defect tracking, and management tools. Referring to FIG. 6, the SDE may be embodied in software executable on an application server 40 resident on a network in communication with one or more client workstations 60. The application server 40 may contain the data repository for the SDE; the data repository, or a portion thereof may be served from a database 50 resident on the application server 40 or from another server on the network.

The systems and methods disclosed herein are presented only by way of example and are not meant to limit the scope of the invention. Other variations and modifications of the systems and methods described above will be apparent to those skilled in the art and as such are considered to be within the scope of the invention, which includes all such variations and modifications as fall within the scope of the appended claims. For example, it should be understood that acts and the order of the acts in the processing described herein may be altered, modified and/or augmented, or that said acts may be carried out by software and/or hardware modules designed for such purpose, and still achieve the desired outcome.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The systems' and methods' data may be stored in one or more media. The media can be comprised in many different types of storage devices and programming constructs, such as RAM, ROM, Flash memory, programming data structures, programming variables, etc. It is noted that data structures describe formats for use in organizing and storing data in databases, programs, memory, or other computer-readable media for use by a computer program. Media can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disc-read only memory (CDROM), compact disc-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. In a data processing system, the components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Various embodiments of the present invention having been thus described in detail by way of example, it will be apparent to those skilled in the art that variations and modifications may be made without departing from the invention. The invention includes all such variations and modifications as fall within the scope of the appended claims.

The invention claimed is:

1. A method for merging changed elements in a software development environment, the software development environment comprising a set of at least one defect associated with a software project, the software project comprising a plurality of elements, each defect being associated with at least one changed element comprising a modified version of an element, the method comprising:

creating a defect record for a defect when the defect or a change request is entered in the software development environment, wherein the defect record comprises a list of elements in the software development environment that are changed as a result of the defect or the change request;

obtaining the list of changed elements in the defect record, the list comprising at least one changed element identifier and a corresponding target, the defect record comprising the list of changed elements associated with the defect; and for each changed element thus listed, attempting a first automated merge of said changed element with its corresponding target;

wherein, the creating the defect record comprises:

creating a first defect record for a first defect or a first change request, the first defect record comprising a first list of software system elements that are changed as a result of the first defect or the first change request; and creating a second defect record for a second defect or a second change request, the second defect record comprising a second list of software system elements that are changed as a result of the second defect or the second change request;

the obtaining the list of changed elements comprises:

querying the first and the second defect records; and building a third list comprising the changed software system elements included in the first and the second defect records and respective target software system elements to which the changed software system elements in the third list is to be merged;

and the attempting the first automated merge comprises:

automatically merging the changed software system elements in the third list with the respective target software system elements.

2. The method of claim 1, further comprising:

generating a fourth list comprising changed elements for which the merge was unsuccessful; and for each changed element of the fourth list, attempting a further automated merge of each of said changed elements for which the merge was unsuccessful with its corresponding target; and if the further automated merge is unsuccessful, invoking a user interface for resolving the merge.

3. The method of claim 2, wherein invoking a user interface for resolving the merge comprises:

providing a user interface for a user to manually merge the said changed element with its corresponding target;

if the said changed element is not manually merged, generating a script for invoking a merge function at a later time.

4. The method of claim 2, wherein generating a fourth list comprising changed elements for which the merge was unsuccessful comprises indicating, in the list of changed elements, that the merge was attempted but not successful.

5. A computer program product comprising a Non-transitory computer-readable memory embodying a computer readable program, wherein the computer readable program when executed on a computer providing a software development environment comprising a set of at least one defect associated with a software project wherein the software project comprises a plurality of version-controlled software development objects, each defect being associated with at least one changed element, and each changed element comprising a modified version-controlled software development object, causes the computer to:

create a defect record for a defect when the defect or a change request is entered in the software development environment, wherein the defect record comprises a list of elements in the software development environment that are changed as a result of the defect or the change request;

obtain the list of changed elements in the defect record, the list comprising at least one changed element identifier and a corresponding target, the defect record comprising the list of changed elements associated with the defect; and for each changed element thus listed, attempt a first automated merge of said changed element with its corresponding target;

wherein, the creating the defect record comprises:

creating a first defect record for a first defect or a first change request, the first defect record comprising a first list of software system elements that are changed as a result of the first defect or the first change request; and creating a second defect record for a second defect or a second change request, the second defect record comprising a second list of software system elements that are changed as a result of the second defect or the second change request;

the obtaining the list of changed elements comprises:

querying the first and the second defect records; and building a third list comprising the changed software system elements included in the first and the second defect records and respective target software system elements to which the changed software system elements in the third list is to be merged;

and the attempting the first automated merge comprises:

automatically merging the changed software system elements in the third list with the respective target software system elements.

6. The computer program product of claim 5, wherein the computer readable program causes the computer to:

generate a fourth list comprising changed elements for which the merge was unsuccessful; and for each changed element of the fourth list, attempt a further automated merge of each of said changed elements for which the merge was unsuccessful with its corresponding target; and if the further automated merge is unsuccessful, invoke a user interface for resolving the merge.

7. The computer program product of claim 6, wherein the computer readable program further causes the computer, when invoking a user interface for resolving the merge, to:

provide a user interface for a user to manually merge the said changed element with its corresponding target;

if the said changed element is not manually merged, generate a script for invoking a merge function at a later time.

8. The computer program product of claim 5, wherein the query comprises an identifier of a changed element.

9. The computer program product of claim 6, wherein the computer readable program further causes the computer to, when generating a fourth list comprising changed elements for which the merge was unsuccessful, indicate, in the list of changed elements, that the merge was attempted but not successful.

10. A system for merging changed elements in a software development environment, the software development environment comprising a set of at least one defect associated with a software project, the software project comprising a plurality of elements, each defect being associated with at least one changed element comprising a modified version of an element, the system comprising:

a processor;

a memory;

a data repository for storing at least one element associated with a software project, and for storing at least one changed element comprising a modified element;

a data repository for storing at least one defect record, the defect record comprising a list of changed elements associated with a defect; and a software development environment interoperable with the data repository for storing at least one defect associated with a software project and for merging changed elements with a corresponding target;

wherein the software development environment, implemented by the processor, is configured to:

create the defect record for the defect when the defect or a change request is entered in the software development environment, wherein the defect record comprises a list of elements in the software development environment that are changed as a result of the defect or the change request;

obtain the list of changed elements in the defect record, the list comprising at least one changed element identifier and a corresponding target; and for each changed element thus listed, attempt a first automated merge of said changed element with its corresponding target;

wherein, the creating the defect record comprises:

creating a first defect record for a first defect or a first change request, the first defect record comprising a first list of software system elements that are changed as a result of the first defect or the first change request; and creating a second defect record for a second defect or a second change request, the second defect record comprising a second list of software system elements that are changed as a result of the second defect or the second change request;

the obtaining the list of changed elements comprises:

querying the first and the second defect records; and building a third list comprising the changed software system elements included in the first and the second defect records and respective target software system elements to which the changed software system elements in the third list is to be merged;

and the attempting the first automated merge comprises:

automatically merging the changed software system elements in the third list with the respective target software system elements.

11. The system of claim 10, wherein the software development environment is further configured to:

generate a fourth list comprising changed elements for which the merge was unsuccessful; and for each changed element of the fourth list, attempt a further automated merge of each of said changed elements for which the merge was unsuccessful with its corresponding target; and if the further automated merge is unsuccessful, invoke a user interface for resolving the merge.

12. The system of claim 11, wherein the software development environment is further configured to:

provide a user interface for a user to manually merge the said changed element with its corresponding target;

if the said changed element is not manually merged, generate a script for invoking a merge function at a later time.

13. The system of claim 10, wherein the query comprises an identifier of a changed element.

14. The system of claim 11, wherein the software development environment is further configured to indicate, in the list of changed elements, that the merge was attempted but not successful, when generating a further list comprising changed elements for which the merge was unsuccessful.

15. The method of claim 1, wherein creating the defect record includes creating an unique file for the defect, which is separate from another file corresponding to another defect, and recording elements that have been changed in the software project in association with the defect in the unique file.

16. The computer program product of claim 5, wherein the created defect record is an unique file created for the defect, which is separate from another file corresponding to another defect, and the changes made to the elements in the software project in association with the defect are recorded in the unique file.

17. The system of claim 10, wherein the created defect record is an unique file created for the defect, which is separate from another file corresponding to another defect, and the changes made to the elements in the software project in association with the defect are recorded in the unique file.

* * * * *